United States Patent
Ishida et al.

(10) Patent No.: US 10,297,993 B2
(45) Date of Patent: May 21, 2019

(54) PROTECTIVE MEMBER-ATTACHED WIRE AND PROTECTIVE MEMBER

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hidetoshi Ishida, Yokkaichi (JP); Housei Mizuno, Yokkaichi (JP); Yasuyuki Yamamoto, Yokkaichi (JP); Atsushi Murata, Yokkaichi (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/774,666

(22) PCT Filed: Nov. 10, 2016

(86) PCT No.: PCT/JP2016/083337
§ 371 (c)(1),
(2) Date: May 9, 2018

(87) PCT Pub. No.: WO2017/090441
PCT Pub. Date: Jun. 1, 2017

(65) Prior Publication Data
US 2018/0331521 A1    Nov. 15, 2018

(30) Foreign Application Priority Data
Nov. 24, 2015   (JP) ................... 2015-228505

(51) Int. Cl.
| | | |
|---|---|---|
| *H01B 7/02* | (2006.01) | |
| *H02G 3/04* | (2006.01) | |
| *H01B 13/012* | (2006.01) | |

(52) U.S. Cl.
CPC ............. *H02G 3/04* (2013.01); *H01B 7/02* (2013.01); *H02G 3/0481* (2013.01); *H01B 13/01263* (2013.01)

(58) Field of Classification Search
None
See application file for complete search history.

(56) References Cited

U.S. PATENT DOCUMENTS 1,905,789 A  *  4/1933  Benner .................... H01B 7/04
                                                                  174/116
2,203,232 A  *  6/1940  Osborne .............. H01B 7/2806
                                                                  156/148

(Continued)

FOREIGN PATENT DOCUMENTS

| JP | 2012146500 A | 8/2012 |
|---|---|---|
| JP | 2013058438 A | 3/2013 |
| JP | 2014176109 A | 9/2014 |

OTHER PUBLICATIONS

JP2012146500_Translated. Sumitomo Wiring Systems. Aug. 2, 2012. JPO.*

(Continued)

*Primary Examiner* — Dimary S Lopez Cruz
*Assistant Examiner* — Muhammed Azam
(74) *Attorney, Agent, or Firm* — Reising Ethington, P.C.

(57) ABSTRACT

A protective member-attached wire is provided with: an electric wire; and a protective member that is made of a sheet-shaped nonwoven member and is wrapped around the electric wire to cover the electric wire. The protective member includes: a first portion obtained by heating a portion of the nonwoven member; and a second portion that (Continued)

is softer than the first portion of the nonwoven member. The first portion and the second portion are each distributed over the entire circumference of the electric wire in a circumferential direction of the electric wire, and are distributed over the entire protective member in a longitudinal direction of the electric wire.

9 Claims, 7 Drawing Sheets

(56) References Cited

U.S. PATENT DOCUMENTS

| | | | | |
|---|---|---|---|---|
| 2,245,766 A * | 6/1941 | Fischer | H01B 11/1808 174/130 |
| 2,662,931 A * | 12/1953 | Mougey | H01B 7/226 174/106 R |
| 2,881,243 A * | 4/1959 | Ebel | H01B 7/2825 156/55 |
| 3,033,727 A * | 5/1962 | Cram | B29C 61/06 156/53 |
| 3,584,518 A * | 6/1971 | Hurlow | F16C 1/10 74/502.5 |
| 3,629,489 A * | 12/1971 | Jachimowicz | H01B 7/208 174/105 R |
| 3,649,745 A * | 3/1972 | Volk | H01B 1/02 174/107 |
| 3,791,205 A * | 2/1974 | Hooker | G01L 1/2287 73/767 |
| 4,018,983 A * | 4/1977 | Pedlow | C08K 13/04 106/18.24 |
| 4,219,013 A * | 8/1980 | Okada | A61B 1/00089 396/17 |
| 4,284,842 A * | 8/1981 | Arroyo | H01B 7/295 174/102 D |
| 4,510,348 A * | 4/1985 | Arroyo | H01B 7/295 174/121 A |
| 4,511,611 A * | 4/1985 | Moisson | H02G 15/1806 428/34.2 |
| 4,750,805 A * | 6/1988 | Vaderwall | G02B 6/443 174/109 |
| 4,780,574 A * | 10/1988 | Neuroth | H01B 7/046 156/52 |
| 5,966,062 A * | 10/1999 | Rivi | B23Q 3/1543 335/289 |
| 8,455,080 B2 * | 6/2013 | Baer | B32B 5/26 428/189 |
| 8,723,040 B2 * | 5/2014 | Sakura | H01R 4/185 174/68.1 |
| 9,090,801 B2 * | 7/2015 | Siebert | C09J 7/04 |
| 9,576,700 B2 * | 2/2017 | Yamamoto | B60R 16/0215 |
| 9,725,622 B2 * | 8/2017 | Korthals | C09J 7/0207 |
| 2005/0155608 A1* | 7/2005 | Pavcnik | A61B 17/0057 128/831 |
| 2005/0259913 A1* | 11/2005 | Pignot | G02B 6/2804 385/15 |
| 2006/0193576 A1* | 8/2006 | Lester | H01B 7/08 385/114 |
| 2011/0067920 A1* | 3/2011 | Toyama | B60R 16/0207 174/72 A |
| 2015/0147498 A1* | 5/2015 | Aquino | B32B 1/08 428/34.5 |
| 2016/0087414 A1* | 3/2016 | Satoh | B60R 16/0207 174/72 A |
| 2016/0103287 A1* | 4/2016 | Jost | G02B 6/441 385/112 |
| 2016/0126709 A1* | 5/2016 | Maeda | H02G 3/0462 174/68.3 |
| 2016/0163416 A1* | 6/2016 | Wakabayashi | H01B 3/302 174/72 A |
| 2016/0236631 A1* | 8/2016 | Kamijo | B60R 16/0215 |
| 2016/0240282 A1* | 8/2016 | Yamamoto | H01B 7/2825 |
| 2016/0336094 A1* | 11/2016 | Omura | H01B 7/1855 |

OTHER PUBLICATIONS

International Preliminary Report on Patentability for Application No. PCT/JP2016/083337 dated Sep. 15, 2017. 15 pages.
International Search Report for Application No. PCT/JP2016/083337 dated Dec. 6, 2016. 5 pages.

* cited by examiner

PROTECTIVE MEMBER-ATTACHED WIRE AND PROTECTIVE MEMBER

CROSS REFERENCE TO RELATED APPLICATIONS

This application claims the priority of Japanese patent application JP2015-228505 filed on Nov. 24, 2015, the entire contents of which are incorporated herein.

TECHNICAL FIELD

The present invention relates to a protective member to be attached to the circumference of an electric wire or the like.

BACKGROUND ART

Protective member-attached wires in which a protective member is attached to the circumference of an electric wire or the like are disclosed in, for example, Patent Document 1. The wire harness described in Patent Document 1 (JP2013-192415A) is formed such that a first portion of a cover member and a second portion thereof that is softer than the first portion partially overlap each other to cover a bundle of electric wires. It is described that, with this measure, the relatively soft second portion can suppress the occurrence of strange noises, and at the same time, the relatively hard first portion can define a route of the bundle of electric wires.

SUMMARY

However, the wire harness described in Patent Document 1 has, on the outside of the bundle of electric wires, a region in which only the first portion is present and a region in which only the second portion is present. In this case, the region in which only the first portion is present on the outside of the bundle of electric wires has an impaired ability to suppress the occurrence of strange noises (hereinafter, referred to as "noise insulation ability") compared to a region that includes the second portion. Furthermore, the region in which only the second portion is present on the outside of the bundle of electric wires has an impaired ability to protect the bundle of electric wires (hereinafter, referred to as "protection ability") compared to a region that includes the first portion.

Accordingly, it is an object of the present disclosure to provide a technology that can make the protection ability and the noise insulation ability around electric wires as uniform as possible.

In order to solve the above-described problem, a protective member-attached wire according to a first aspect includes: an electric wire; and a protective member that is made of a sheet-shaped nonwoven member, and includes a first portion obtained by heating a portion of the nonwoven member, and a second portion that is softer than the first portion, the protective member being wrapped a multiple and integer number of times around the electric wire to cover the electric wire, wherein the first portion and the second portion are each distributed over the entire circumference of the electric wire in a circumferential direction of the electric wire, and are distributed over the entire protective member in a longitudinal direction of the electric wire. At least one of the first portion or the second portion is distributed in a scattered manner in a surface of the protective member.

A protective member-attached wire according to a second aspect relates to the protective member-attached wire according to the first aspect, wherein the first portion and the second portion are each wrapped an integer number of times around the electric wire.

A protective member-attached wire according to a third aspect includes: an electric wire; and a protective member that is made of a sheet-shaped nonwoven member, and includes a first portion obtained by heating a portion of the nonwoven member, and a second portion that is softer than the first portion, the protective member being wrapped a multiple and integer number of times around the electric wire to cover the electric wire, wherein the first portion and the second portion are each distributed over the entire circumference of the electric wire in a circumferential direction of the electric wire, and are distributed over the entire protective member in a longitudinal direction of the electric wire. The first portion and the second portion are each wrapped an integer number of times around the electric wire. The first portion and the second portion are separate from each other in a width direction in which a wrapping start portion and a wrapping end portion of the protective member are connected to each other. The first portion includes a curved portion that is curved with the same curvature radius as the radius of the electric wire in a state prior to the protective member being wrapped around the electric wire.

A protective member-attached wire according to a fourth aspect relates to the protective member-attached wire according to the third aspect, wherein the first portion and the second portion are each wrapped once around the electric wire.

A protective member-attached wire according to a fifth aspect includes: an electric wire; and a protective member that is made of a sheet-shaped nonwoven member, and includes a first portion obtained by heating a portion of the nonwoven member, and a second portion that is softer than the first portion, the protective member being wrapped a multiple and integer number of times around the electric wire to cover the electric wire, wherein the first portion and the second portion are each distributed over the entire circumference of the electric wire in a circumferential direction of the electric wire, and are distributed over the entire protective member in a longitudinal direction of the electric wire. The first portion and the second portion are each wrapped an integer number of times around the electric wire. The first portion and the second portion are separate from each other in a width direction in which a wrapping start portion and a wrapping end portion of the protective member are connected to each other. The protective member is intimately adhered to the electric wire.

A protective member-attached wire according to a seventh aspect includes: an electric wire; and a protective member that is made of a sheet-shaped nonwoven member, and includes a first portion obtained by heating a portion of the nonwoven member, and a second portion that is softer than the first portion, the protective member being wrapped a multiple number of times around the electric wire to cover the electric wire, wherein the first portion and the second portion are each distributed over the entire circumference of the electric wire in a circumferential direction of the electric wire, and are distributed over the entire protective member in a longitudinal direction of the electric wire, and at least one of the first portion or the second portion is distributed in a scattered manner in a surface of the protective member.

A protective member-attached wire according to an eighth aspect relates to the protective member-attached wire according to the first, second, and seventh aspects, wherein the first portion of the protective member is more compressed in the thickness direction relative to the second portion, so that a portion that is to serve as the first portion is recessed.

A protective member-attached wire according to a ninth aspect relates to the protective member-attached wire according to any one of the first to fifth, seventh, and eighth aspects, wherein the protective member is wrapped so that the first portion is located on the electric wire side.

A protective member according to a tenth aspect is made of a sheet-shaped nonwoven member, and is wrapped a multiple number of times around an electric wire to cover the electric wire, the protective member including: a first portion that is obtained by heating a portion of the nonwoven member and is provided so as to be capable of being wrapped an integer number of times around the electric wire; and a second portion that is the remaining portion of the nonwoven member excluding the first portion, is softer than the first portion, and is provided so as to be capable of being wrapped an integer number of times around the electric wire. At least one of the first portion or the second portion is distributed in a scattered manner in a surface of the protective member.

According to the first to fifth, eighth, and ninth aspects, the protective member includes: a first portion obtained by heating a portion of the nonwoven member, and a second portion that is softer than the first portion, the protective member being wrapped a multiple and integer number of times around the electric wire, the first portion and the second portion are each distributed over the entire circumference of the electric wire in a circumferential direction of the electric wire, and are distributed over the entire protective member in a longitudinal direction of the electric wire. Accordingly, it is possible to make the protection ability and the noise insulation ability uniform.

Particularly, according to the second aspect, since the first portion and the second portion are wrapped an integer number of times around the electric wire, it is possible to make the protection ability and the noise insulation ability more uniform.

Particularly, according to the third and fifth aspects, since the first portion and the second portion are separate from each other in a width direction in which a wrapping start portion and a wrapping end portion of the protective member are connected to each other, it is easy to manufacture the protective member.

Particularly, according to the fourth aspect, since the first portion and the second portion are each wrapped once around the electric wire, it is possible to make the protection ability and the noise insulation ability uniform, with the minimum number of wraps being made.

Particularly, according to the third aspect, since the first portion includes a curved portion that is curved with the same curvature radius as the radius of the electric wire in a state prior to the protective member being wrapped around the electric wire, it is easy to wrap the protective member around the electric wire.

Particularly, according to the first and seventh aspects, at least either of the first portion and the second portion is distributed in a scattered manner in a surface of the protective member. Also with this measure, it is possible to add the protection ability and the noise insulation ability that are uniform over the entirety. Furthermore, it is easy to cut a sheet of a large size into protective members of a desired size, and use them.

Particularly, according to the eighth aspect, the first portion of the protective member is more compressed in the thickness direction relative to the second portion, so that a portion that is to serve as the first portion is recessed. Accordingly, by performing, for example, embossing processing during a web bonding step, which is a part of a normal nonwoven fabric formation process, it is possible to form the first portion and the second portion. Accordingly, it is possible to manufacture the protective member more easily.

Particularly, according to the ninth aspect, since the protective member is wrapped so that the first portion is located on the electric wire side, the first portion can prevent wearing of the electric wire, and the second portion can prevent the occurrence of strange noises that may occur when the protective member comes into contact with an external member.

According to the tenth aspect, since the protective member includes: a first portion that is obtained by heating a portion of the nonwoven member and is provided so as to be capable of being wrapped an integer number of times around the electric wire; and a second portion that is the remaining portion of the nonwoven member excluding the first portion, is softer than the first portion, and is provided so as to be capable of being wrapped an integer number of times around the electric wire, it is possible to make the protection ability and the noise insulation ability uniform.

DESCRIPTION OF EMBODIMENTS

First Embodiment

Figure 1:
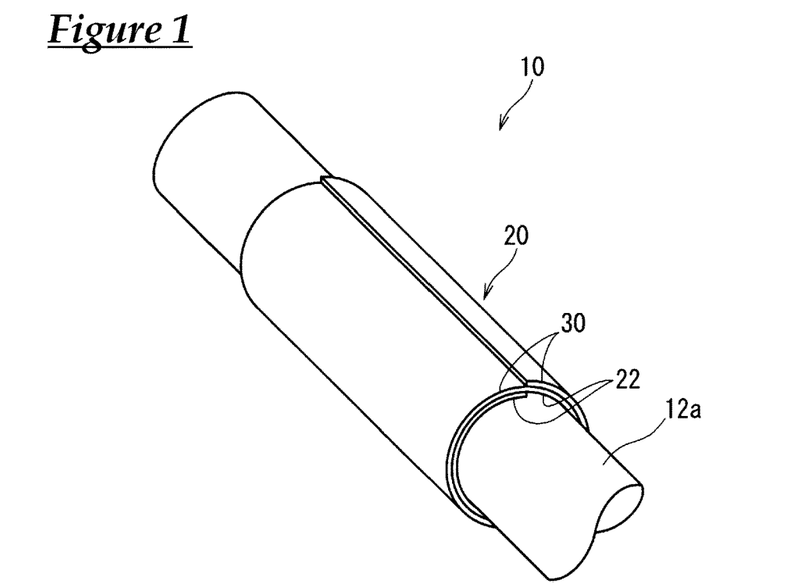
FIG. 1 is a perspective view illustrating a protective member-attached wire according to a first embodiment.
Figure 2:
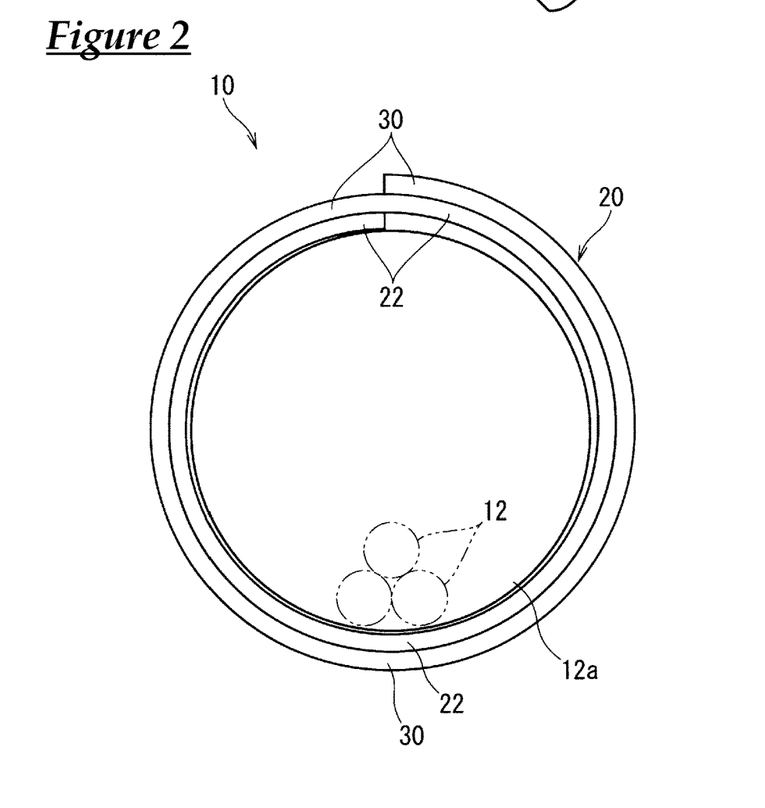
FIG. 2 is a side view illustrating the protective member-attached wire according to the first embodiment.

Hereinafter, a protective member-attached wire and a protective member according to a first embodiment will be described. FIG. 1 is a perspective view illustrating a protective member-attached wire 10 according to the first embodiment. FIG. 2 is a side view illustrating the protective member-attached wire 10 according to the first embodiment.

Figure 3:
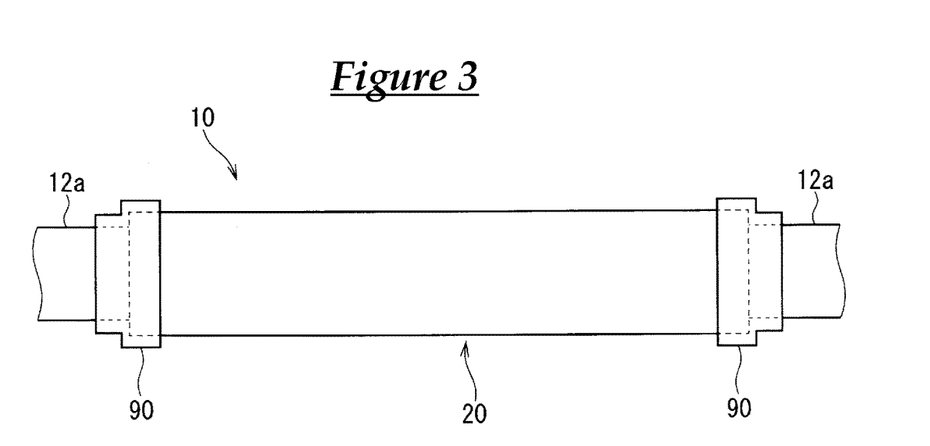
FIG. 3 is a plan view illustrating the protective member-attached wire according to the first embodiment.

FIG. 3 is a plan view illustrating the protective member-attached wire 10 according to the first embodiment.

The protective member-attached wire 10 includes an electric wire 12, and a protective member 20 attached to the circumference of the electric wire 12.

It is sufficient that at least one electric wire 12 is included. The protective member 20 is externally fitted onto the electric wire 12 at an intermediate portion in the longitudinal direction thereof. The electric wire 12 is configured to have a covered portion obtained by extruding a resin over the outer circumference of a core wire so that the resin covers the core wire, for example. Here, a description is given taking, as an example, an electric wire bundle 12a in which a plurality of electric wires 12 are bundled together. Note that the electric wire bundle 12a may be provided with a light fiber or the like extending along the electric wires 12. The electric wires 12 are arranged at arrangement target locations in a vehicle or the like and are used to electrically connect various types of electrical equipment installed in the vehicle or the like. Note that FIGS. 1 to 3, and FIGS. 7 and 8 show a schematic shape of the electric wire bundle 12a.

Figure 5:
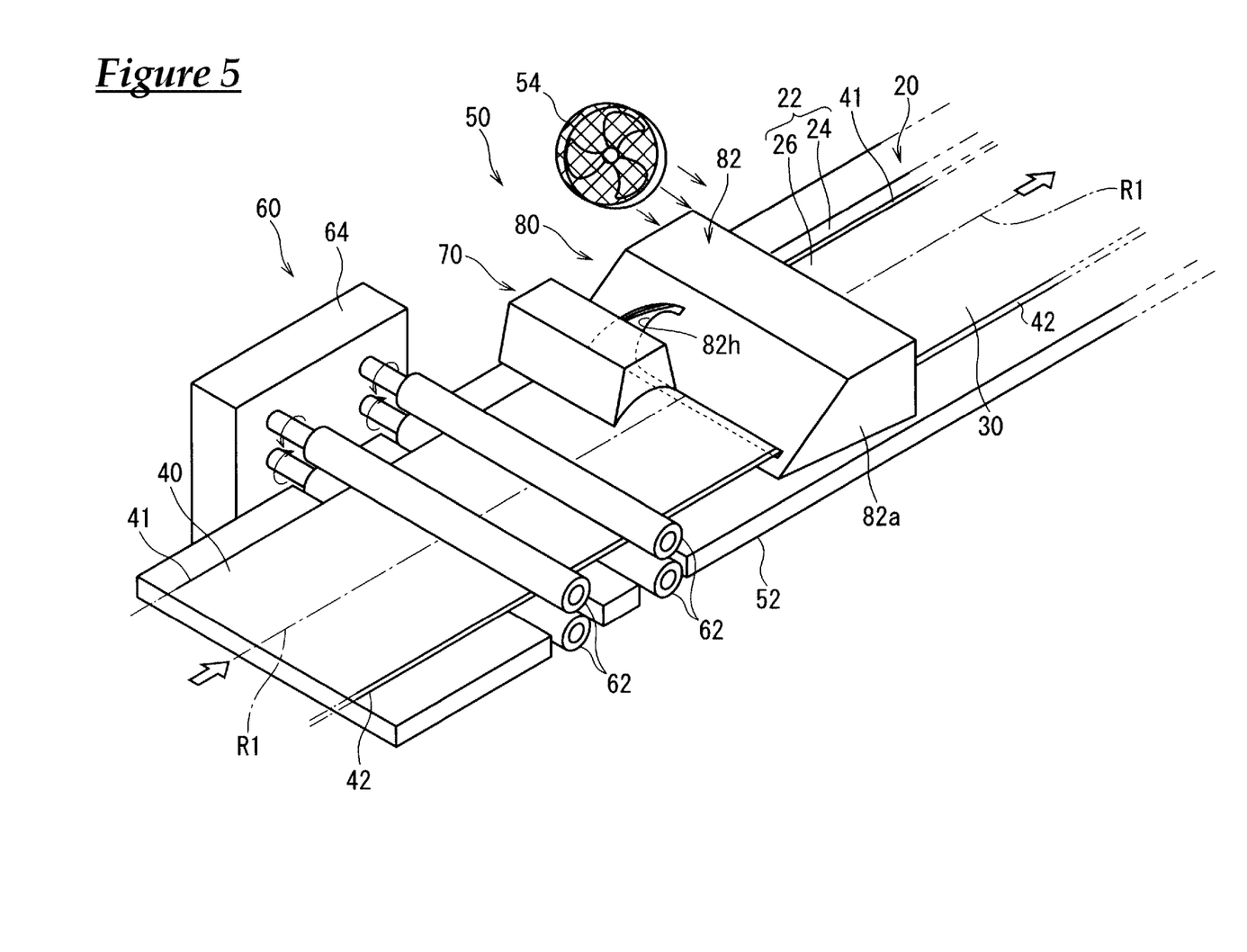
FIG. 5 is a diagram illustrating a procedure in which the protective member according to the first embodiment is manufactured.

The protective member 20 is formed by bending a sheet-shaped nonwoven member 40 (referred to also as "nonwoven fabric") (see FIG. 5). In the following, when the protective member 20 is laid out in a sheet shape, "longitudinal direction" of the protective member 20 refers to the direction in which an electric wire 12 around which the protective member 20 is to be wrapped extends, and "width direction" of the protective member 20 refers to the direction orthogonal to the direction in which the electric wire 12 around which the protective member 20 is to be wrapped extends. In other words, here, "width direction" refers to the direction in which a wrapping start portion and a wrapping end portion of the protective member 20 are connected to each other.

The following will describe the nonwoven member 40 of which the protective member 20 is made. The nonwoven member 40 contains, for example, a tangle of elementary fibers and an adhesive resin, which is referred to as a binder. The adhesive resin is a thermoplastic resin that has a melting point (for example, a melting point between about 110 C.° and about 150 C.°) lower than the melting point of the elementary fiber. When such a nonwoven member 40 is heated to a temperature that is lower than the melting point of the elementary fibers and is higher than the melting point of the adhesive resin, the adhesive resin melts and enters spaces between the elementary fibers. Then, when the temperature of the nonwoven member 40 falls to a temperature lower than the melting point of the adhesive resin, the adhesive resin hardens in a state in which it binds the surrounding elementary fibers together. Accordingly, the nonwoven member 40 becomes harder than it was before being heated, and is molded into a shape obtained by being confined in a mold or the like while being cooled after having been heated.

The adhesive resin is, for example, a granular resin, a fibrous resin, or the like. It is also conceivable that the adhesive resin is provided to cover the circumference of a core fiber. Such a fiber having a structure in which its core fiber is covered by an adhesive resin is referred to as "binder fiber" or the like. The material of the core fiber is the same as the material of the elementary fiber, for example.

Furthermore, it is sufficient that the elementary fiber keeps its fibrous state at the melting point of the adhesive resin, and thus various types of fibers including resin fiber may be used. Furthermore, for example, thermoplastic resin fiber whose melting point is lower than the melting point of the elementary fiber may be used as the adhesive resin.

As a combination of the elementary fiber and the adhesive resin that constitute the nonwoven member 40, it is conceivable to use a resin fiber mainly containing PET (polyethylene terephthalate) as the elementary fiber, and a copolymer resin of PET and PEI (polyethylene isophthalate) as the adhesive resin, for example. In such a nonwoven member 40, the melting point of the elementary fiber is about 250 C.°, and the melting point of the adhesive resin is a temperature between about 110 C.° and about 150 C.°.

Specifically, the protective member 20 includes a first portion 22 and a second portion 30. Here, the first portion 22 and the second portion 30 are separate from each other in the width direction of the protective member 20. The protective member 20 is wrapped around the electric wires 12 to cover the electric wires 12. Furthermore, the protective member 20 is wrapped a multiple and integer number of times around the electric wires 12 such that the first portion 22 and the second portion 30 are each wrapped an integer number of times around the electric wires 12.

The first portion 22 is a portion obtained by heating a portion of the nonwoven member 40. The first portion 22 is wrapped an integer number of times around the electric wire bundle 12a.

The second portion 30 is a portion that is softer than the first portion 22. Here, the second portion 30 is the remaining portion of the nonwoven member 40 excluding the first portion 22. The second portion 30 is wrapped an integer number of times around the electric wire bundle 12a.

To change the hardness between the first portion 22 and the second portion 30 of the single nonwoven member 40, it is conceivable to heat, for example, only the portion of the nonwoven member 40 that is to serve as the first portion 22 and use the portion that is to serve as the second portion 30 as is. Alternatively, it is also conceivable to set the heating amount for the portion of the nonwoven member 40 that is to serve as the first portion 22 to be larger than the heating amount for the portion that is to serve as the second portion 30, for example. Alternatively, it is also conceivable to press only the portion that is to serve as the first portion 22 while the nonwoven member 40 is heated, or to set the pressure to be applied to the portion to serve as the first portion 22 to be larger than the pressure to be applied to the portion to serve as the second portion 30, for example.

Note that the phrase "the first portion 22 and the second portion 30 are wrapped an integer number of times" does not necessarily require that ends thereof are accurately aligned with each other, but rather includes a case where they are slightly misaligned with respect to each other due to an error in processing or the like. More specifically, as described above, at least the first portion 22 of the protective member 20 is formed by heating the nonwoven member 40. Here, the nonwoven member 40 typically shrinks when it is heated. At this time, the degree of shrinkage of the nonwoven member 40 is not necessarily constant, and may vary depending on each nonwoven member 40 or each portion of the nonwoven member 40. Accordingly, even if the same manufacturing method is used to manufacture protective members 20 from nonwoven members 40 of the same size, the finished protective members 20 may have slightly different sizes due to the above-described reason. Accordingly, even if the size of the nonwoven members 40 is set so that the ends of the portions are accurately aligned with each other taking the degree of shrinkage as well into account, there may be cases where the ends of a finished protective member 20 are not aligned with each other in a circumferential direction due to the above-described error or the like. Also, the phrase "wrapped an integer number of times" in this context is assumed to include such misalignment.

Here, the first portion 22 and the second portion 30 are each wrapped once around the electric wire bundle 12a. Accordingly, the first portion 22 refers to the portion of the protective member 20 of the protective member-attached wire 10 that starts from one end, in the circumferential direction, of the protective member 20 to a point at which one wrap is complete, and the second portion 30 refers to the portion of the protective member 20 of the protective member-attached wire 10 that starts from the other end, in the circumferential direction, of the protective member 20 to a point at which one wrap is complete. In other words, when the protective member 20 is formed from the sheet-shaped nonwoven member 40, the region that is substantially one half, in the width direction, of the sheet-shaped nonwoven member 40 including one side end 41 in the width direction is the portion to be molded into the first portion 22, and the region that is substantially one half, in the width direction, of the sheet-shaped nonwoven member 40 including another side end 42 in the width direction is the portion to be molded into the second portion 30.

Of course, it is not essential that the first portion 22 and the second portion 30 are each wrapped once around the electric wire bundle 12a. The number of times the first portion 22 and the second portion 30 are wrapped may be set appropriately. Examples in which at least either of the first portion 22 and the second portion 30 is wrapped a plurality of times will be described in detail with reference to a second embodiment and a third embodiment, which will be described later. However, when the first portion 22 and the second portion 30 are each wrapped once around the electric wire bundle 12a, it is possible to make the protection ability and the noise insulation ability uniform, with the minimum number of wraps being made.

Also, the protective member 20 here is wrapped around the electric wire bundle 12a so that the first portion 22 is located on the electric wire bundle 12a side. However, it is not essential that the protective member 20 is wrapped around the electric wire bundle 12a with the first portion 22 located on the electric wire bundle 12a side. The protective member 20 may also be wrapped around the electric wire bundle 12a with the second portion 30 located on the electric wire bundle 12a side. However, as a result of the protective member 20 being wrapped with the first portion 22 located on the electric wire bundle 12a side, the first portion 22 can suppress wearing of the electric wire bundle 12a, and the second portion 30 can suppress the occurrence of strange noises that may occur when the protective member 20 comes into contact with an external member.

Figure 4:
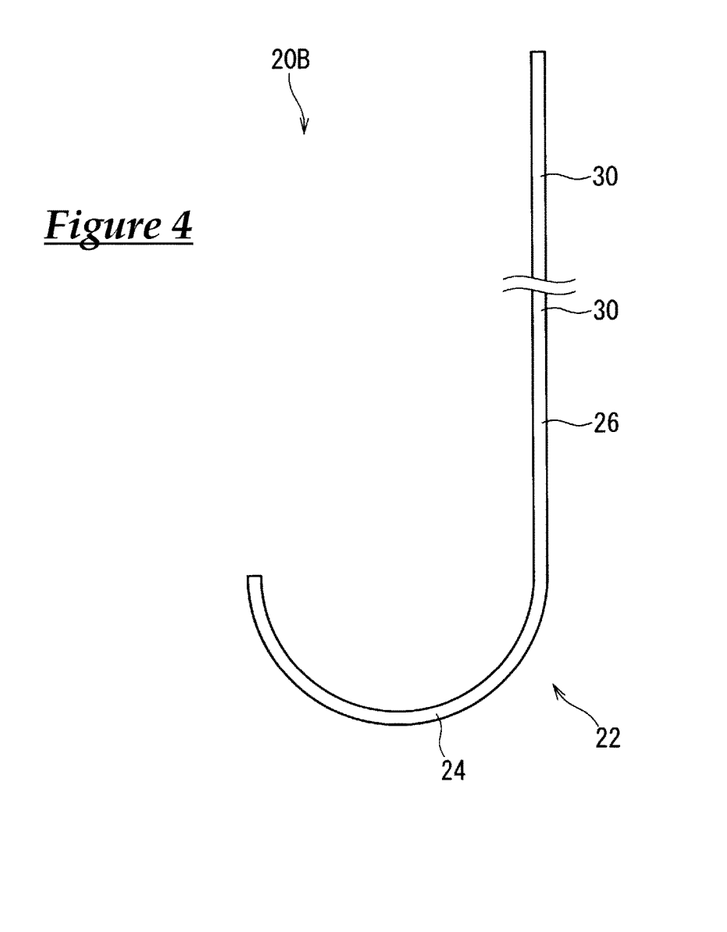
FIG. 4 is a side view illustrating a protective member according to the first embodiment.

The following will describe a protective member 20B, which is a protective member before it is wrapped around the electric wire bundle 12a. FIG. 4 is a side view illustrating the protective member 20 according to the first embodiment, more specifically, the protective member 20B before it is wrapped around the electric wire bundle 12a.

The first portion 22 of the protective member 20B includes a curved portion 24. Here, the first portion 22 of the protective member 20B also includes a planar portion 26.

The curved portion 24 is curved with the same curvature radius as the radius of the electric wire bundle 12a to which the protective member 20B is to be attached. Here, the portion of the first portion 22 that extends from one end of the protective member 20 to a half a wrap serves as the curved portion 24. In other words, here, the curved portion 24 is formed in a semi-cylindrical shape on one end side of the protective member 20B.

The planar portion 26 is formed extending planarly. Here, the portion between the curved portion 24 and the second portion 30 serves as the planar portion 26. Here, the planar portion 26 extends from an end of the curved portion 24, in a direction of the tangent to this end.

As described above, due to the curved portion 24 being formed in a semi-cylindrical shape and the planar portion 26 being formed extending from an end of the curved portion 24 in the direction of the tangent to this end, the first portion 22 is J-shaped overall. Accordingly, it is easy to insert the electric wire bundle 12a to the inner surface side of the curved portion 24 of the first portion 22.

Note that the curved portion 24 and the planar portion 26 may have the same hardness, or may have different degrees of hardness. A difference in hardness between the portions of the first portion 22 is not necessarily required, as long as the first portion 22 as a whole is harder than the second portion 30. Here, the planar portion 26 is formed so as to be softer than the curved portion 24. More specifically, the planar portion 26 is soft enough to be able to be bent and wrapped around the electric wire bundle 12a. At this time, the planar portion 26 is preferably hard enough to be able to keep the state in which it extends planarly in a natural state.

Here, "natural state" refers to a state in which no intentional external force is exerted by an operator or the like. Note that, when the protective member 20B is held in a state in which the opening of the curved portion 24 is directed upward in a vertical direction, the planar portion 26 may curve under its own weight (gravity) and may close the opening even in the natural state in which the planar portion 26 is hard enough to be able to keep the state in which it extends planarly. However, when the protective member 20B is held in a state in which the opening is directed downward in the vertical direction, the planar portion 26 is prevented from closing the opening in the natural state in which the planar portion 26 is hard enough to be able to keep the state in which it extends planarly.

However, it is not essential that the first portion 22 includes the curved portion 24 and the planar portion 26. It is also possible that, for example, the first portion 22 includes a large curved portion that has a larger curvature radius than that of the curved portion 24, that is, a large curved portion that has a larger curvature radius than the radius of the electric wire bundle 12a to which the protective member 20B is to be attached. Alternatively, it is also possible that the first portion 22 includes a small curved portion that has a smaller curvature radius than that of the curved portion 24, that is, a small curved portion that has a smaller curvature radius than the radius of the electric wire bundle 12a to which the protective member 20B is to be attached. Furthermore, it is also possible that the large curved portion or the small curved portion has a curvature radius that gradually varies. Furthermore, they may be formed alone, or may be combined with each other as appropriate.

Furthermore, even if the first portion 22 includes the curved portion 24, it is not essential that the curved portion 24 is formed with half a wrap. The curved portion 24 may be formed with half a wrap or greater, or with half a wrap or smaller. If the curved portion 24 is formed with half a wrap or smaller, it is possible to insert the electric wire bundle 12a into the inner surface side of the curved portion 24 without opening the curved portion 24. Alternatively, if the curved portion 24 is formed with half a wrap or greater, the electric wire bundle 12a is unlikely to come loose because the electric wire bundle 12a is caught by an end of the curved portion 24, even when an operator tries to pull out the electric wire bundle 12a placed on the inner surface side of the curved portion 24.

Furthermore, it is not essential that the curved portion 24 of the first portion 22 is formed on one end side of the protective member 20. The curved portion 24 may also be formed on the side on which it is contiguous to the second portion 30, or may be interposed between planar portions 26. If, for example, the curved portion 24 of the first portion 22 is formed with half a wrap and is interposed between planar portions 26, the first portion 22 will be formed in an almost U shape.

Furthermore, even if the first portion 22 includes the planar portion 26, it is not essential that the planar portion 26 extends from an end of the curved portion 24 in a direction of the tangent to this end. It is also conceivable that, for example, the planar portion 26 extends inward or outward of the direction of the tangent. It is here preferable that the planar portion 26 be formed so as not to close the opening of the curved portion 24.

The second portion 30 extends substantially planarly from the planar portion 26 of the first portion 22 in a direction in which the planar portion 26 extends. The second portion 30 is also formed so as to be able to be wrapped around the electric wire bundle 12a. At this time, the second portion 30 is preferably formed so as not to close the opening of the curved portion 24 in a natural state.

Note that the second portion may also be curved as a whole, or may be formed in a shape in which a curve and a plane are combined with each other, similar to the first portion 22.

The following will describe a method for manufacturing the protective member 20B. FIG. 5 is a diagram illustrating an example of a method for manufacturing the protective member 20B according to the embodiment. Here, as shown in FIG. 5, a method for manufacturing the protective member 20B using a protective-member manufacturing apparatus 50 will be described.

A configuration of the protective-member manufacturing apparatus 50 will be described first.

The protective-member manufacturing apparatus 50 is provided with an upstream-side sheet conveying mechanism 60, a heating unit 70, and a molding unit 80. Furthermore, the protective-member manufacturing apparatus 50 may also be provided with a cooling fan 54 as needed.

In the example shown in FIG. 5, the molding unit 80 is supported on a base plate 52. Furthermore, it is conceivable that the heating unit 70 is directly supported on the base plate 52, or the molding unit 80 is supported on the base plate 52 via the heating unit 70.

Upstream-Side Sheet Conveying Mechanism

The upstream-side sheet conveying mechanism 60 is a mechanism for conveying the sheet-shaped nonwoven member 40 containing a thermoplastic resin along a predetermined path. Hereinafter, the path on which the sheet-shaped nonwoven member 40 is conveyed is referred to as "conveyance path R1". The heating unit 70 and the molding unit 80 are arranged at positions along the conveyance path R1.

The upstream-side sheet conveying mechanism 60 is arranged at a position on the conveyance path R1 that is upstream of the position of the heating unit 70. The upstream-side sheet conveying mechanism 60 feeds the sheet-shaped nonwoven member 40 to the position of the heating unit 70.

The upstream-side sheet conveying mechanism 60 includes a pair of feed rollers 62, and a feed-roller driving unit 64. The pair of feed rollers 62 are arranged at a position on the conveyance path R1 upstream of the position of the heating unit 70, and are members that rotate with the flat sheet-shaped nonwoven member 40 interposed therebetween. In the example shown in FIG. 5, the upstream-side sheet conveying mechanism 60 includes two pairs of feed rollers 62 arranged side by side in the direction of the conveyance path R1.

The feed-roller driving unit 64 is a driving mechanism for rotating the pair of feed rollers 62. For example, the feed-roller driving unit 64 includes a motor, and a gear mechanism for transmitting the rotational force of the motor to the pair of feed rollers 62.

It is also conceivable that the feed-roller driving unit 64 rotates the two rollers of the pair of feed rollers 62 in opposite directions, or the feed-roller driving unit 64 rotates only one of the pair of feed rollers 62. In the latter case, one of the pair of feed rollers 62 conveys the sheet-shaped nonwoven member 40 to the heating unit 70 side (downstream side), and the other one of the pair of feed rollers 62 is rotated while being in contact with the moving sheet-shaped nonwoven member 40.

The pair of feed rollers 62 is formed in the shape of, for example, circular cylinders or circular tubes. Preferably, the outer circumferential surfaces of the pair of feed rollers 62 are made of a material that has a high friction resistance to the sheet-shaped nonwoven member 40. For example, it is conceivable that the outer circumferential surfaces of the pair of feed rollers 62 are made of a rubber material such as elastomer.

Heating Unit

The heating unit 70 is a device for heating the sheet-shaped nonwoven member 40 as it moves on the conveyance path R1. The heating unit 70 is a device for heating the sheet-shaped nonwoven member 40 in a contactless manner, such as a hot air blower or an infrared heater, for example.

By heating the sheet-shaped nonwoven member 40 containing a thermoplastic resin, the heating unit 70 softens the sheet-shaped nonwoven member 40 to the extent that it can be plastically deformed. That is, once the sheet-shaped nonwoven member 40 heated by the heating unit 70 is deformed by applying an external force and then cooled, the sheet-shaped nonwoven member 40 keeps its shape when it is cooled.

Note here that the heating unit 70 heats the portion to be molded into the first portion 22, that is, the region that is substantially half the sheet-shaped nonwoven member 40 and includes one end in the width direction thereof. However, the heating unit 70 may also heat the entire region, in the width direction, of the sheet-shaped nonwoven member 40. In this case, in order to make the hardness of the first portion 22 of the resultant protective member 20B and the hardness of the second portion 30 different from each other, it is necessary to change the heating amount, or to press the portion that is to serve as the first portion 22, for example. Note that, when heating the entire region, in the width direction, of the sheet-shaped nonwoven member 40, the portion of the sheet-shaped nonwoven member 40 that is not to be bent when it is molded into the protective member 20B (here, a portion that is to serve as the planar portion 26 of the first portion 22, and the second portion 30) is also molded so as to be harder than the sheet-shaped nonwoven member 40.

Molding Unit

Figure 6:
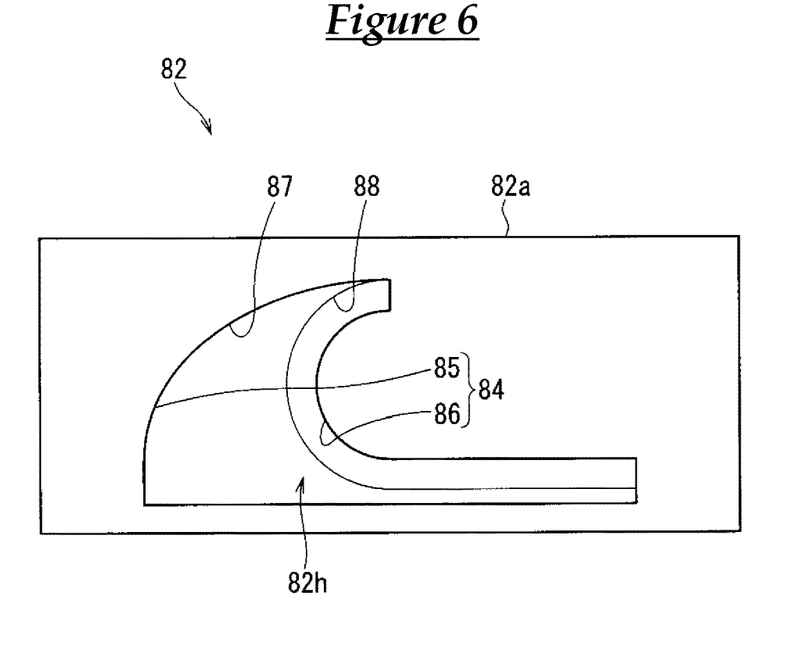
FIG. 6 is a diagram illustrating a mold from the upstream side.

The molding unit 80 is arranged at a position on the conveyance path R1 that is downstream of the position of the heating unit 70. Here, the molding unit 80 includes a mold 82. FIG. 6 is a diagram illustrating the mold 82 when viewed from the upstream side.

The mold 82 has a molding surface 84 for molding the heated sheet-shaped nonwoven member 40 into the shape of the protective member 20. Here, the molding surface 84 is constituted by the inner circumferential surface of a through hole 82*h*, which is open penetrating the upstream and downstream faces of a main body 82*a* of the mold 82. Here, the main body 82*a* of the mold 82 is formed so that the upstream face is inclined with its lower portion protruding to the upstream side relative to the upper portion. Accordingly, the upstream side of the through hole 82*h* is formed in the shape of a groove that is open upward, and the downstream side of the through hole 82*h* is formed in a closed groove. Specifically, the molding surface 84 includes an outer molding surface 85 and an inner molding surface 86.

The outer molding surface 85 supports one of two main surfaces of the sheet-shaped nonwoven member 40 that serves as an outer circumferential surface when the sheet-shaped nonwoven member 40 is molded into the protective member 20B. The portion of the outer molding surface 85 that is used to mold the curved portion 24 is shaped such that it gradually changes from a substantially flat surface to a shape approximating a ring shape conforming to the outer circumferential surface, toward the downstream side of the conveyance path R1 from the upstream side. Furthermore, the portion of the outer molding surface 85 that is used to mold the planar portion 26 and the second portion 30 is substantially flat-shaped from the upstream side to the downstream side, except for having an insertion facilitating inclination provided on the upstream side.

In the example shown in FIG. 5, the upstream end of the portion of the outer molding surface 85 of the mold 82 that is used to mold the curved portion 24 has a curvature radius larger than that of the outer circumferential surface of the curved portion 24. On the other hand, the downstream end of the portion of the outer molding surface 85 of the mold 82 that is used to mold the curved portion 24 has a curvature radius that is the same as or smaller than the curvature radius of the outer circumferential surface. The outer molding surface 85 is also formed so as to have a curvature radius gradually decreasing toward the downstream end from the upstream end.

The inner molding surface 86 molds the main surface that is to serve as the inner circumferential surface when the sheet-shaped nonwoven member 40 is molded into the protective member 20B. The inner molding surface 86 defines the movement of the sheet-shaped nonwoven member 40 bent by the outer molding surface 85. The inner molding surface 86 is formed in a constant shape from the upstream side of the conveyance path R1 toward the downstream side.

The mold 82 gradually deforms the sheet-shaped nonwoven member 40 sliding on its outer molding surface 85 from a substantially flat shape to a shape approximating the shape of a molded article. Accordingly, the heated sheet-shaped nonwoven member 40 can smoothly pass through the mold 82.

Accordingly, the space between the outer molding surface 85 and the inner molding surface 86 on the downstream side of the mold 82 forms a molding path 88 for confining the sheet-shaped nonwoven member 40 to obtain the shape of the protective member 20B, and the space between the outer molding surface 85 and the inner molding surface 86 on the upstream side of the mold 82 forms a guiding path 87 for guiding the sheet-shaped nonwoven member 40 to the molding path 88 (e. g., for gradually bringing the sheet-shaped nonwoven member 40 into the shape of the protective member 20B). Here, the groove-shaped portion, on the upstream side, of the through hole 82*h* serves as the guiding path 87, and the closed ring-shaped portion on the downstream side serves as the molding path 88.

If the portion of the mold 82 that constitutes the guiding path 87 is not heated by a thermal source such as a heater, that is, if the temperature of the portion of the mold 82 that constitutes the guiding path 87 is lower than the temperature of the heated sheet-shaped nonwoven member 40, the sheet-shaped nonwoven member 40 will be cooled as a result of coming into contact with the inner circumferential surface of the guiding path 87. It is however not possible to mold the sheet-shaped nonwoven member 40 into a desired shape, if the sheet-shaped nonwoven member 40 hardens before reaching the molding path 88.

Accordingly, it is preferable that a temperature fall in the sheet-shaped nonwoven member 40 due to heat exchange with the portion of the mold 82 that constitutes the guiding path 87 is not large. For example, a case is conceivable in which the portion of the mold 82 that constitutes the guiding path 87 is made of a material whose heat transfer coefficient between the sheet-shaped nonwoven member 40 and air is lower than that of a material for the portion of the mold 82 that constitutes the molding path 88. A case is also conceivable in which the temperature of the portion of the mold 82 that constitutes the guiding path 87 is kept at a predetermined temperature by a not-shown heating means such as a heater or a hot air blower.

The heated sheet-shaped nonwoven member 40 passes through the molding path 88 while its two main surfaces thereof are respectively in contact with the outer molding surface 85 and the inner molding surface 86. Accordingly, the portion of the sheet-shaped nonwoven member 40 that has passed through the molding path 88 has the same shape as the molding path 88, that is, the shape of the molded protective member 20B.

Furthermore, the temperature of the portion of the mold 82 that constitutes the molding path 88 is kept at a temperature lower than the temperature of the sheet-shaped nonwoven member 40 immediately before it is inserted into the molding path 88, due to the portion naturally radiating heat or being forcibly cooled. Therefore, the portion of the mold 82 that constitutes the molding path 88 exchanges heat with the sheet-shaped nonwoven member 40 to cool the sheet-shaped nonwoven member 40.

The portion of the sheet-shaped nonwoven member 40 at one side end 41 in its width direction that passes through the molding path 88 is cooled while being confined to obtain a semicircular arc shape and hardens while being bent in the semicircular arc shape. That is, the portion of the sheet-shaped nonwoven member 40 that passes through the molding path 88 is molded into the semicircular arc shape. Accordingly, the portion of the moving sheet-shaped nonwoven member 40 that is located at one side end 41 in its width direction and is downstream on the conveyance path R1 relative to the position of the molding unit 80 is in a semi-cylindrically molded state. The semi-cylindrically molded portion serves as the curved portion 24 of the protective member 20B.

The portion of the mold 82 that constitutes the molding path 88 is preferably made of a material that has a high heat transfer coefficient between the sheet-shaped nonwoven member 40 and air. It is conceivable, for example that the mold 82 is a metal member such as stainless-steel, iron or copper.

Furthermore, in order to improve the heat dissipation ability of the mold 82, it is also conceivable that a heat dissipating fan is provided on the surface of the portion of the mold 82 that constitutes the molding path 88 excluding the inner surface.

In the example shown in FIG. 5, the portion of the mold 82 that constitutes the molding path 88 is forcibly cooled by the cooling fan 54.

The following will show how the protective member 20B is manufactured using the protective-member manufacturing apparatus 50.

That is, first, the sheet-shaped nonwoven member 40 is conveyed by the upstream-side sheet conveying mechanism 60. Specifically, the portion of the sheet-shaped nonwoven member 40 that is to be molded into the curved portion 24 of the first portion 22 is arranged on the left side when viewed from the upstream side, and the portion that is to be molded into the planar portion 26 and the second portion 30 of the first portion 22 is arranged on the right side when viewed from the upstream side.

Then, the sheet-shaped nonwoven member 40 containing a thermoplastic resin moving along the conveyance path R1 is heated using the heating unit 70 of the protective-member manufacturing apparatus 50. At this time, if the heat shrinkage ratio of one main surface of the sheet-shaped nonwoven member 40 (main surface that is not in contact with the upper surface of the base plate 52) is set to be larger than the heat shrinkage ratio of the other main surface of the sheet-shaped nonwoven member 40, the heated sheet-shaped nonwoven member 40 is likely to shrink with the one main surface located on the inner side.

Then, molding is performed using the guiding path 87, which is arranged at a position on the conveyance path R1 that is located on the downstream side of the position of the heating unit 70. Here, the sheet-shaped nonwoven member 40 heated by the heating unit 70 is gradually deformed from a substantially flat shape to a shape approximating the shape of the molding path 88. More specifically, due to the sheet-shaped nonwoven member 40 that is being conveyed along the conveyance path R1 sliding on the outer molding surface 85 of the guiding path 87, the sheet-shaped nonwoven member 40 is deformed.

Then, molding is performed using the molding path 88, which is arranged at a position on the conveyance path R1 that is located on the downstream side of the positions of the heating unit 70 and the guiding path 87. Here, due to the sheet-shaped nonwoven member 40 passing along the molding path 88, the portion of the sheet-shaped nonwoven member 40 that is passing along the molding path 88 is cooled while being confined to obtain the shape of a finished article.

Then, the sheet-shaped nonwoven member 40, when passing along the molding path 88, is cooled due to heat exchange with the mold 82 and is hardened in the same shape as that of the molding path 88. Accordingly, the portion of the sheet-shaped nonwoven member 40 that is conveyed on the downstream side, on the conveyance path R1, relative to the position of the molding path 88 serves as the protective member 20B.

A series of protective members 20B thus manufactured using the protective-member manufacturing apparatus 50 are cut to a required length and used as one protective member 20B unit. In other words, the protective-member manufacturing apparatus 50 can manufacture multiple units of the protective members 20. Of course, it is also possible that a sheet-shaped nonwoven member 40 is molded into one protective member 20B unit.

Of course, it is not essential that the protective member 20B is manufactured using the protective-member manufacturing apparatus 50, and the protective member 20B may also be manufactured through manual operation by an operator, or by using another device or the like.

For example, the following procedure is preferable to attach the protective member 20B to the electric wire bundle 12a.

That is, as described above, since the curved portion 24 of the first portion 22 of the protective member 20B is open in a natural state, the electric wire bundle 12a can easily be inserted into the curved portion 24. More specifically, since the curved portion 24 is formed in a semi-cylindrically shape having substantially the same curvature radius as the radius of the electric wire bundle 12a, and the planar portion 26 is formed extending from the curved portion 24 in the direction of the tangent, the distance between the curved portion 24 and the planar portion 26 (distance between an edge on a free end side of the curved portion 24, and the planar portion 26) is substantially the same as the outer diameter of the electric wire bundle 12a. Accordingly, it is possible to guide the electric wires 12 to which the protective member 20B is to be attached all together to the opening of the curved portion 24, without opening the space between the planar portion 26 and the curved portion 24. It is also possible to insert the electric wire bundle 12a guided to the opening of the curved portion 24 into the curved portion 24, without opening the curved portion 24.

Note that if the distance between the curved portion 24 and the planar portion 26 is set to a dimension smaller than the outer diameter of the electric wire bundle 12a, it is also possible to divide the electric wires 12 and insert them in order, or to open the planar portion or the curved portion 24 so that the distance between the curved portion 24 and the planar portion 26 is the outer diameter of the electric wire bundle 12a or greater, and then insert the electric wire bundle 12a once. When the planar portion 26 is opened, the distance between the curved portion 24 and the planar portion 26 may serve as a hold, and it is thus easy to open the planar portion 26.

After the electric wire bundle 12a is accommodated in the curved portion 24, the planar portion 26 is closed and the second portion 30 is wrapped so as to overlap the outer side of the first portion 22. Accordingly, the opening used to insert the electric wire bundle 12a is closed, and the protective member 20B is attached to the electric wire bundle 12a.

Note that, preferably, binding members such as tape 90 can be wound around the protective member 20 so as to maintain, after the second portion 30 has been wrapped, the state in which the second portion 30 is wrapped. At this time, it is more preferable that the tape 90 is wound spanning an end, in the longitudinal direction, of the protective member 20 and the electric wire bundle 12a so that the protective member 20 is positioned with respect to the electric wire bundle 12a. At this time, a piece of tape 90 or the like may also be wound at an intermediate portion, in the longitudinal direction, of the protective member 20. Accordingly, the protective member 20 is more reliably prevented from becoming loose.

In the protective member-attached wire 10 according to the first embodiment, the protective member 20 includes the first portion 22, which is a portion formed by heating a portion of the nonwoven member 40 and wrapping it an integer number of times around the electric wire 12, and the second portion 30, which is a remaining portion of the nonwoven member 40 excluding the first portion 22, is softer than the first portion 22, and is wrapped an integer number of times around the electric wire 12, thus enabling the protection ability and the noise insulation ability to be uniform.

Particularly, since the first portion 22 and the second portion 30 are each wrapped once around the electric wire 12, it is possible to make the protection ability and the noise insulation ability uniform, with the minimum number of wraps being made.

Furthermore, since the protective member 20 is wrapped so that the first portion 22 is located on the electric wire 12 side, the first portion 22 can suppress wearing of the electric wire 12, and the second portion 30 can suppress the occurrence of strange noises that may occur when the protective member 20 comes into contact with an external member.

Furthermore, since the first portion 22 includes the curved portion 24, which can be curved with the same curvature radius as the radius of the electric wire 12 before the protective member 20 is wrapped around the electric wire 12, it is easy to wrap the protective member 20 around the electric wire 12.

Second Embodiment

Figure 7:
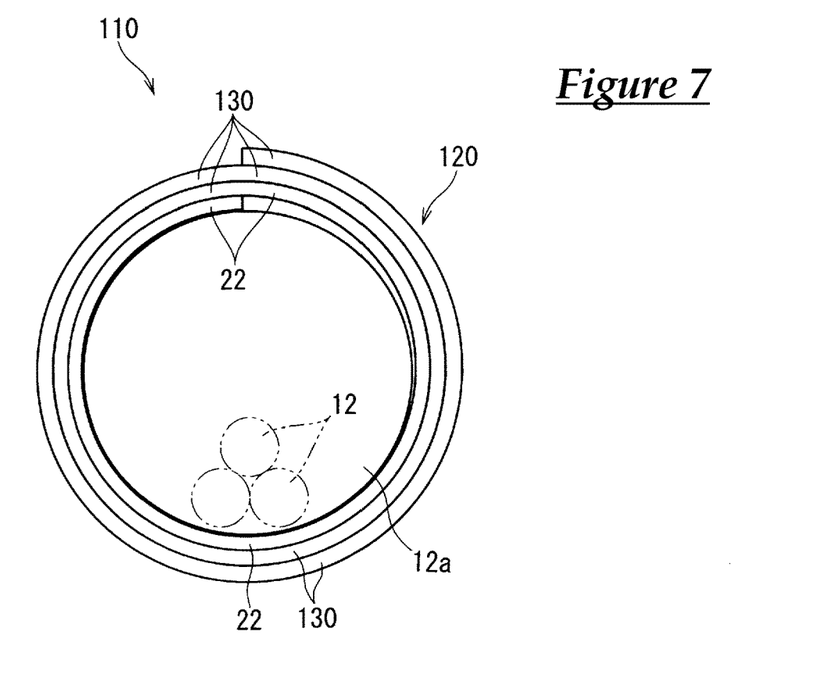
FIG. 7 is a side view illustrating a protective member-attached wire according to a second embodiment.

The following will describe a protective member-attached wire according to a second embodiment. FIG. 7 is a side view illustrating a protective member-attached wire 110 according to the second embodiment. Note that, in the description of the present embodiment, the same reference numerals are given to the same constituent components as those described in the first embodiment, and a description thereof is omitted.

The protective member-attached wire 110 according to the second embodiment differs from the protective member-attached wire 10 according to the first embodiment in that a protective member 120 is wrapped three times around the electric wire bundle 12a.

More specifically, here, the first portion 22 is wrapped once as in the first embodiment. On the other hand, a second portion 130 is wrapped twice around the electric wire bundle 12a. Accordingly, it is possible to enhance the noise insulation ability of the protective member 120.

However, a configuration is also possible in which the second portion is wrapped once as in the first embodiment, while the first portion is wrapped twice around the electric wire bundle 12a. In this case, it is possible to enhance the protection ability of the protective member.

Third Embodiment

Figure 8:
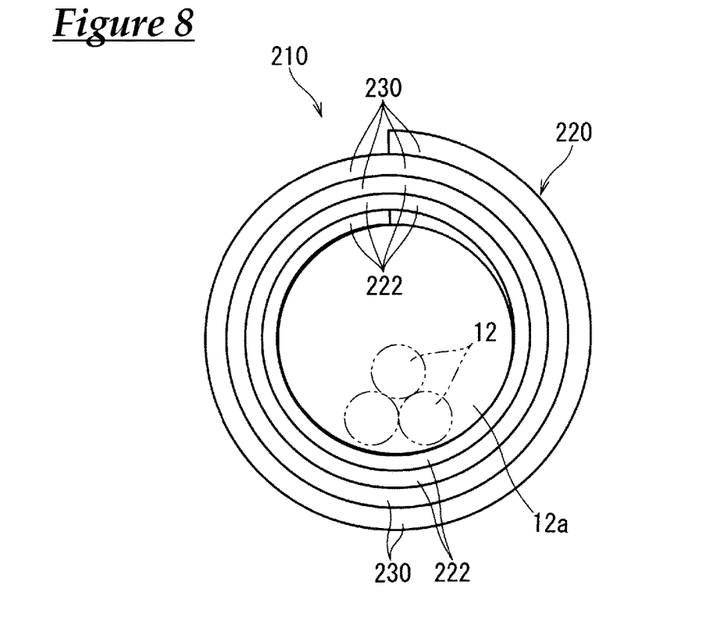
FIG. 8 is a side view illustrating a protective member-attached wire according to a third embodiment.

The following will describe a protective member-attached wire according to a third embodiment. FIG. 8 is a side view illustrating a protective member-attached wire 210 according to the third embodiment. Note that, in the description of the present embodiment, the same reference numerals are given to the same constituent components as those described in the foregoing embodiments, and a description thereof is omitted.

The protective member-attached wire 210 according to the third embodiment differs from the protective member-attached wire 10 according to the first embodiment in that a protective member 220 is wrapped four times around the electric wire bundle 12a.

More specifically, here, a first portion 222 and a second portion 230 are both wrapped twice around the electric wire bundle 12a. Accordingly, it is possible to enhance the protection ability and the noise insulation ability of the protective member 220.

However, a configuration is also possible in which the first portion is wrapped once as in the first embodiment, and the second portion is wrapped three times around the electric wire bundle 12a. In this case, it is possible to enhance the noise insulation ability of the protective member. Furthermore, a configuration is also possible in which the second portion is wrapped once as in the first embodiment, and the first portion is wrapped three times around the electric wire bundle 12a. In this case, it is possible to enhance the protection ability of the protective member.

Fourth Embodiment

Figure 9:
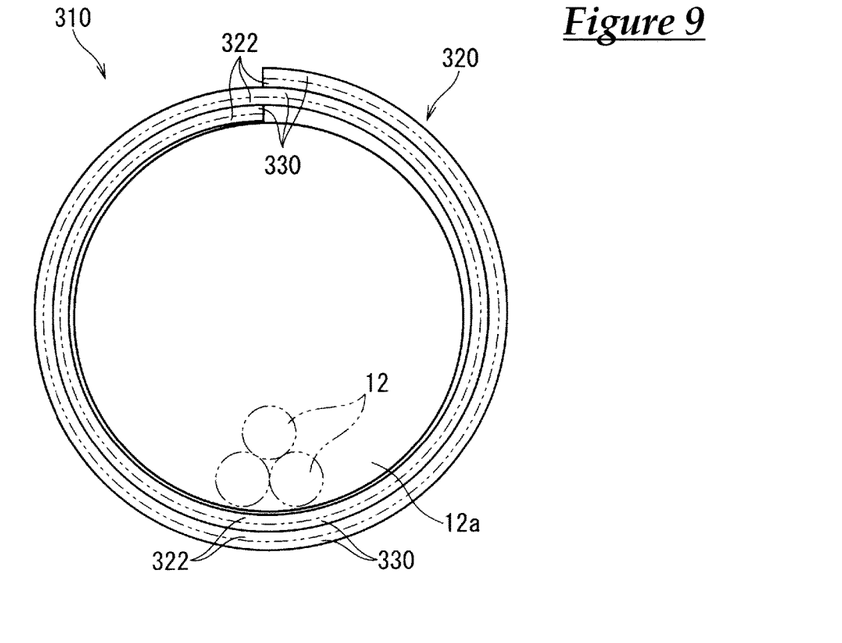
FIG. 9 is a side view illustrating a protective member-attached wire according to a fourth embodiment.
Figure 10:
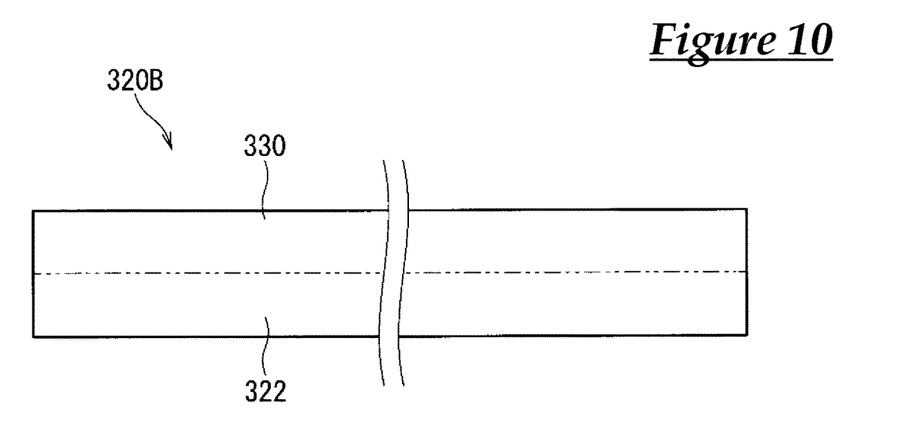
FIG. 10 is a side view illustrating a protective member according to the fourth embodiment.

The following will describe a protective member-attached wire according to a fourth embodiment. FIG. 9 is a side view illustrating a protective member-attached wire 310 according to the fourth embodiment. FIG. 10 is a side view illustrating a protective member 320B according to the fourth embodiment. Note that, in the description of the present embodiment, the same reference numerals are given to the same constituent components as those described in the foregoing embodiments, and a description thereof is omitted.

The protective member-attached wire 310 according to the fourth embodiment includes a protective member 320 that has a different shape from the protective member 20 of the protective member-attached wire 10 according to the first embodiment.

More specifically, the protective member 320 includes a first portion 322 and a second portion 330 that are separate from each other in a thickness direction of the protective member 320. In this case, the first portion 322 and the second portion 330 may be set to have the same thickness, or either thereof may be set to have a larger thickness.

Such a protective member 320 can be manufactured, for example, by applying, when heating the nonwoven member 40, different amounts of heat to one side in the thickness direction and the other side in the thickness direction.

Furthermore, here, the first portion 322 and the second portion 330 are separate from each other in the thickness direction over the entire protective member 320. Accordingly, the number of times the protective member 320, namely, the first portion 322 and the second portion 330 are wrapped are the same (here, these members are all wrapped twice), but this is not essential. There may be a case where, only in a portion of the protective member, the first portion 322 and the second portion 330 are separate from each other in the thickness direction. In other words, it is sufficient that, at least in a portion of the protective member, the first portion 322 and the second portion 330 are separate from each other in the thickness direction.

According to this protective member-attached wire 310, since the first portion 322 and the second portion 330 are separate from each other in the thickness direction of the protective member 320, it is easy to cut a sheet of a large size into protective members 320 of a desired size, and use them.

Fifth Embodiment

Figure 11:
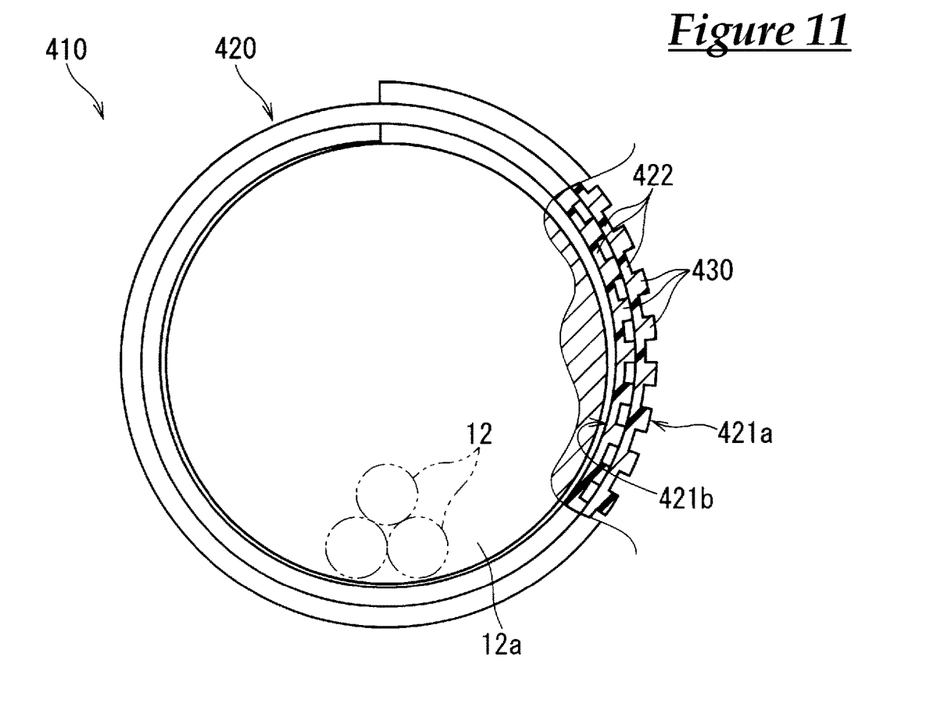
FIG. 11 is a partially cut-out side view illustrating a protective member-attached wire according to a fifth embodiment.
Figure 12:
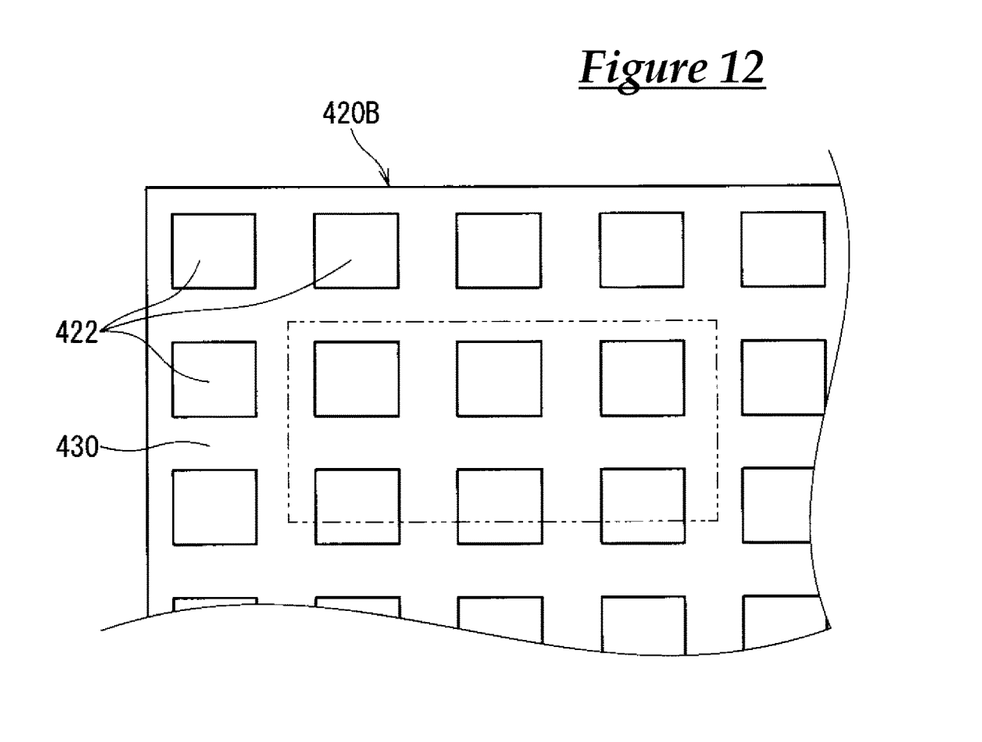
FIG. 12 is a plan view illustrating a protective member according to the fifth embodiment.
Figure 13:
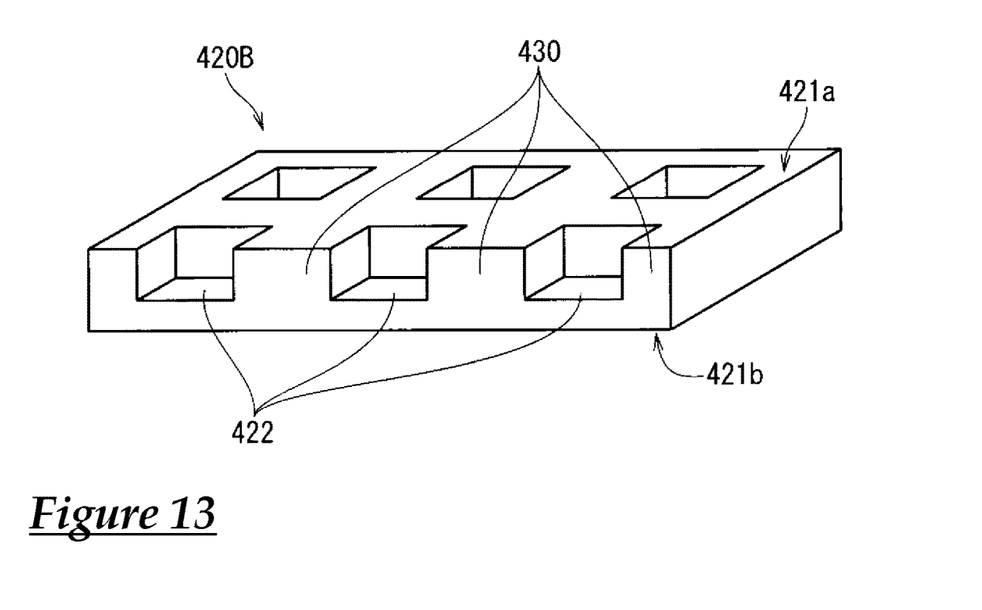
FIG. 13 is a perspective view illustrating the protective member according to the fifth embodiment.

The following will describe a protective member-attached wire according to a fifth embodiment. FIG. 11 is a partially-cut out side view illustrating a protective member-attached wire 410 according to the fifth embodiment. FIG. 12 is a plan view illustrating a protective member 420B according to the fifth embodiment. FIG. 13 is a perspective view illustrating the protective member 420B according to the fifth embodiment. Note that FIG. 13 shows a cut-out region of FIG. 12 indicated by a phantom line (dashed-two dotted line). Note that, in the description of the present embodiment, the same reference numerals are given to the same constituent components as those described in the foregoing embodiments, and a description thereof is omitted.

The protective member-attached wire 410 according to the fifth embodiment includes a protective member 420 that has a different shape from the protective member 20 of the protective member-attached wire 10 according to the first embodiment.

Specifically, at least either of a first portion 422 and a second portion 430 (here, the first portion 422) of the protective member 420B is distributed in a scattered manner in the surface of the protective member 420B. Here, the first portion 422 is formed in a square that is shorter in the longitudinal direction and the width direction than the protective member 420B. As shown in FIG. 12, a plurality of first portions 422 are distributed in a scattered manner in the surface of the protective member 420B, and the portion on the surface of the protective member 420B in which no first portion 422 is formed serves as the second portion 430. Here, the first portions 422 are arrayed in the longitudinal direction and the width direction of the protective member 420B. Accordingly, the second portion 430 has a lattice shape. Here, a gap between first portions 422 that are adjacent to each other in a direction in which a wrapping start part and a wrapping end part are connected to each other, that is, the dimension of the second portion 430 between adjacent first portions 422 may be set to be same as that of the first portions 422 in this direction, or either thereof may be set to be greater.

The first portions 422 are formed so as to be recessed from the second portion 430 in the thickness direction of the protective member 420B. Here, the first portions 422 are recessed from one main surface 421a of the protective member 420B toward another main surface 421b side. Accordingly, the one main surface 421a of the protective member 420B is uneven, and the other main surface 421b of the protective member 420B is planar without unevenness. At this time, the first portions 422 are configured to be harder than the second portion 430 as a result of the extent of compacting of the nonwoven member being larger in the first portions 422 than the second portion 430, more specifically, either of the portions of the nonwoven member that have almost the same thickness having a larger degree of compaction. Conceivable members that come into direct contact with the protective member 420B include, in addition to the electric wires located inside, a vehicle body constituent component such as a body, as a member located outside of the protective member 420B, for automotive usage for example. But, it is not preferable in view of the protection ability that a protection target comes into direct contact only with the second portion 430. Depending on usage, if an electric wire is a protection target that is most likely to come into local contact, the size of the first portion 422 and the width of the second portion 430 may be the same as or smaller than the diameter of the electric wire 12, for example. The square recesses of the first portions 422 may have a longitudinal dimension (size along the circumference of the electric wire bundle 12a) of about 1 millimeter and a lateral dimension (size in the direction in which the bundle of electric wires 12b extend) of about 1 millimeter, and the second portion 430 has a width of about 1 millimeter therebetween. Furthermore, of course, the size and the number of first portions 422, and the width of the second portion 430 and the like correspond to the required levels of noise insulation and protection, and are values that are set as appropriate based on, for example, the amount of compaction, the heating temperature, as well as the shape of a protection target or the like.

Here, the protective member 420B is wrapped around the electric wire bundle 12a with the other main surface 421b, which is even, directed to the electric wire bundle 12a side. Accordingly, the one main surface 421a, which is uneven, serves as the outer surface of the protective member 420. Accordingly, it is possible to improve the noise insulation ability.

Furthermore, here, in the protective member 420 to be wrapped twice around the electric wire bundle 12a, the first portions 422 of the outer circumferential side protective member 420 and the first portions 422 of the inner circumferential side protective member 420 are misaligned with respect to each other in the circumferential direction. However, it is also possible that the first portions 422 of the outer circumferential side protective member 420 and the first portions 422 of the inner circumferential side protective member 420 are aligned with each other in the circumferential direction.

Such protective members 420B can be manufactured by, for example, embossing a nonwoven material. More specifically, for example, a nonwoven material (called as "web") that is formed through spunbonding and in which fibers are stacked is continuously fed to a pair of heating rollers. At this time, the surface of one of the pair of heating rollers is shaped with recesses and projections that are inverted with respect to the recesses and projections formed in the protective member 420B. Then, when the web is fed while being interposed between the pair of heating rollers, a part of the web is more compressed relative to the remaining portion by the projection shaped portions formed on the one heating roller, and the recess-and-projection shape of the heating roller is inverted, and is transferred to the web sequentially. Furthermore, when heating the entire web using the pair of heating rollers in this state, portions of the web bind with each other while maintaining their compressed state. Accordingly, a nonwoven member with recesses and projections formed based on the recess-and-projection shape of the heating roller is manufactured continuously. By cutting the nonwoven member with recesses and projections into pieces of an appropriate size, the protective member 420B prior to being wrapped around the electric wire bundle 12a is complete. Then, the protective member 420B is wrapped at an appropriate position on the electric wire bundle 12a with the other main surface 421b, which is planar, directed to the electric wire bundle 12a side, resulting in a complete protective member-attached wire 410.

Note that the description has been given assuming that the first portions 422 are square shaped, but this is not essential. For example, the first portions may also have another polygonal shape such as a triangular shape or a pentagonal shape, or may also have a circular shape, or the like. Furthermore, for example, the first portions may also be formed as a groove extending in one direction on the plane on the one main surface side of the protective member.

Furthermore, the recesses created when the first portions 422 are formed are cuboid-shaped, but this is not essential. For example, the first portions may also be formed in a frustum shape, that is, a shape such that the opening expands in the thickness direction to the one main surface 421a side.

Furthermore, the description has been given assuming that only one main surface 421a side of the protective member 420B is uneven, but this is not essential. It is also possible that both of the main surfaces 421a and 421b of the protective member 420B are uneven. For example, both of the main surfaces 421a and 421b may have square-shaped recesses. In this case, the recesses on the other main surface 421b side may be formed at the same positions of the surface as the recesses on the one main surface 421a side. Alternatively, they may also be formed at positions of the surface that are shifted from the recesses on the one main surface 421a side, such as positions on the back side of the portions corresponding to the lattice of the lattice-shaped second portion on the one main surface 421a side. Alternatively, it is also possible that, for example, a plurality of first grooves extending in a first direction of the plane on the one main surface 421a of the protective member are lined up in a second direction of the surface, and a plurality of second grooves extending in the second direction on the other main surface 421b of the protective member are lined up in the first direction. In this case, the portion of the first portion in which the first grooves and the second grooves cross each other is formed so as to be harder than the portion in which only the first grooves or second grooves are formed.

The description has been given assuming that the protective member 420 includes the first portions 422 that are distributed and the second portion 430 that is lattice shaped, but the layout of the first portions 422 and the second portion 430 is not limited to this. For example, the layout of the first and second portions may also be inverted with respect to the protective member 420. In other words, the first portion may be lattice-shaped, and the second portions may be distributed. Alternatively, a layout is also possible in which, for example, first portions and second portions are formed in the same rectangular shape, and the four sides of the first portions are enclosed by the second portions, and the four sides of the second portions are enclosed by the first portions, that is, the first portions and the second portions are distributed overall without the first portions being adjacent to each other and without the second portions being adjacent to each other. In this case, there will be the same number of first portions and second portions, and as a result, they will be wrapped an integer number of times (for example, if the protective member is wrapped twice, both of the first portions and the second portions will be wrapped by one wrap).

Furthermore, in the protective member 420, there may be a portion on the outside of the electric wire bundle 12a in which only the second portion 430 is present, but even in this case, first portions 422 are located immediately near the second portion 430, and due to the multiple first portions 422 being distributed over the entire electric wire bundle 12a in the circumferential direction thereof (here, over the entire protective member 420 in the circumferential direction of the electric wire bundle 12a) and over the entire protective member 420 in the direction in which the electric wire bundle 12a extends, it is possible to achieve the protection ability sufficient for the protection of the electric wire bundle 12a.

According to this protective member-attached wire 410, at least either of the first portions 422 and the second portion 430 (here, the first portions 422) is distributed in a scattered manner in the surface of the protective member 420B. Also with this measure, it is possible to add the protection ability and the noise insulation ability that are uniform over the entirety. Furthermore, because the protective member 420B does not particularly have directionality in the width direction and the longitudinal direction, it is easy to cut a sheet of a large size into protective members 420B of a desired size, and use them.

Furthermore, the protective member 420B is formed such that the first portions 422 are more compressed in the thickness direction relative to the second portion 430, and the portions that are to serve as the first portions 422 are recessed. Accordingly, by performing embossing processing during a web bonding step, which is a part of a normal nonwoven fabric formation process, it is possible to form the first portions 422 and the second portion 430. This makes it possible to simplify the process of manufacturing the protective member 420B, and to manufacture the protective member 420B more easily.

Note that configurations described in the above-described embodiments may be combined with each other as appropriate as long as they are not inconsistent with each other.

The details of the present disclosure have been described above, but the description above is exemplary in all aspects and the present invention is not limited to this. It is to be construed that various modifications that are not shown as examples are possible without departing from the scope of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Protective member-attached wire
12 Electric wire
12a Bundle of electric wires
20, 20B Protective member
22 First portion
24 Curved portion
26 Planar portion
30 Second portion
40 Nonwoven member
50 Protective-member manufacturing apparatus
60 Upstream-side sheet conveying mechanism
70 Heating unit
80 Molding unit

The invention claimed is:
1. A protective member-attached wire comprising:
an electric wire; and a protective member that is made of a sheet-shaped nonwoven member, and includes a first portion obtained by heating a portion of the nonwoven member, and a second portion that is softer than the first portion, the protective member being wrapped a multiple and integer number of times around the electric wire to cover the electric wire, wherein the first portion and the second portion are each distributed over an entire circumference of the electric wire in a circumferential direction of the electric wire, and are distributed over the entire protective member in a longitudinal direction of the electric wire, and at least one of the first portion or the second portion is distributed in a scattered manner in a surface of the protective member.

2. The protective member-attached wire according to claim 1, wherein the first portion and the second portion are each wrapped an integer number of times around the electric wire.

3. A protective member-attached wire comprising:

an electric wire; and a protective member that is made of a sheet-shaped nonwoven member, and includes a first portion obtained by heating a portion of the nonwoven member, and a second portion that is softer than the first portion, the protective member being wrapped a multiple and integer number of times around the electric wire to cover the electric wire, wherein the first portion and the second portion are each distributed over an entire circumference of the electric wire in a circumferential direction of the electric wire, and are distributed over the entire protective member in a longitudinal direction of the electric wire, the first portion and the second portion are each wrapped an integer number of times around the electric wire, the first portion and the second portion are separate from each other in a width direction in which a wrapping start portion and a wrapping end portion of the protective member are connected to each other, and the first portion includes a curved portion that is curved with a same curvature radius as a radius of the electric wire in a state prior to the protective member being wrapped around the electric wire.

4. The protective member-attached wire according to claim 3, wherein the first portion and the second portion are each wrapped once around the electric wire.

5. A protective member-attached electric wire comprising:

an electric wire; and a protective member that is made of a sheet-shaped nonwoven member, and includes a first portion obtained by heating a portion of the nonwoven member, and a second portion that is softer than the first portion, the protective member being wrapped a multiple and integer number of times around the electric wire to cover the electric wire, wherein the first portion and the second portion are each distributed over an entire circumference of the electric wire in a circumferential direction of the electric wire, and are distributed over the entire protective member in a longitudinal direction of the electric wire, the first portion and the second portion are each wrapped an integer number of times around the electric wire, the first portion and the second portion are separate from each other in a width direction in which a wrapping start portion and a wrapping end portion of the protective member are connected to each other, and the protective member is intimately adhered to the electric wire.

6. A protective member that is made of a sheet-shaped nonwoven member, and is wrapped a multiple number of times around an electric wire to cover the electric wire, comprising:

a first portion that is obtained by heating a portion of the nonwoven member and is provided to be wrapped an integer number of times around the electric wire; and a second portion that is a remaining portion of the nonwoven member excluding the first portion, is softer than the first portion, and is provided so as to be capable of being wrapped an integer number of times around the electric wire, wherein at least one of the first portion or the second portion is distributed in a scattered manner in a surface of the protective member.

7. A protective member-attached electric wire comprising:

an electric wire; and a protective member that is made of a sheet-shaped nonwoven member, and includes a first portion obtained by heating a portion of the nonwoven member, and a second portion that is softer than the first portion, the protective member being wrapped a multiple number of times around the electric wire to cover the electric wire, wherein the first portion and the second portion are each distributed over an entire circumference of the electric wire in a circumferential direction of the electric wire, and are distributed over the entire protective member in a longitudinal direction of the electric wire, and at least one of the first portion or the second portion is distributed in a scattered manner in a surface of the protective member.

8. The protective member-attached wire according to claim 1, wherein the first portion of the protective member is more compressed in a thickness direction relative to the second portion, so that a portion that is to serve as the first portion is recessed.

9. The protective member-attached wire according to claim 1, wherein the protective member is wrapped so that the first portion is located on an electric wire side.

* * * * *